United States Patent
Lee

(10) Patent No.: US 7,064,305 B2
(45) Date of Patent: Jun. 20, 2006

(54) APPARATUS AND METHOD FOR CONTROLLING OUTPUT OF MAGNETRON OF MICROWAVE OVEN

(75) Inventor: Sung-Ho Lee, Hwasung (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 89 days.

(21) Appl. No.: 10/282,089

(22) Filed: Oct. 29, 2002

(65) Prior Publication Data

US 2003/0218009 A1 Nov. 27, 2003

(30) Foreign Application Priority Data

May 25, 2002 (KR) ................................ 2002-29097

(51) Int. Cl.
*H05B 6/68* (2006.01)

(52) U.S. Cl. ...................... 219/702; 219/715; 219/721; 219/761

(58) Field of Classification Search ................ 219/702, 219/715, 716, 721, 710, 723, 761; 363/49, 363/97

See application file for complete search history.

(56) References Cited

U.S. PATENT DOCUMENTS

| 4,967,051 A | * | 10/1990 | Maehara et al. | ............ 219/721 |
| 5,274,208 A | * | 12/1993 | Noda | ......................... 219/715 |

FOREIGN PATENT DOCUMENTS

| JP | 1-65794 | * | 3/1989 | ................. 219/721 |
| JP | 2-282620 | * | 11/1990 | |
| JP | 3-57194 | * | 3/1991 | ................. 219/716 |
| JP | 4-253180 | * | 9/1992 | ................. 219/716 |
| KR | 2001-66583 | | 7/2001 | |

* cited by examiner

*Primary Examiner*—Philip H. Leung
(74) *Attorney, Agent, or Firm*—Staas & Halsey LLP

(57) ABSTRACT

An apparatus and method for controlling an output of a magnetron of a microwave oven is provided. The method includes setting an initial input current to generate an output higher than rated output. Thereafter, the magnetron is driven using initial input current of the setting. The output of the magnetron is varied within a preset time to prevent overheating caused by driving of the magnetron.

23 Claims, 8 Drawing Sheets

APPARATUS AND METHOD FOR CONTROLLING OUTPUT OF MAGNETRON OF MICROWAVE OVEN

CROSS-REFERENCE TO RELATED APPLICATION

This application claims the benefit of Korean Application No. 2002-29097, filed May 25, 2002, in the Korean Intellectual Property Office, the disclosure of which is incorporated herein by reference.

BACKGROUND OF THE INVENTION

1. Field of the Invention

The present invention relates generally to a microwave oven, and more particularly, to an apparatus and method for controlling the output of a magnetron of a microwave oven, which is capable of stably obtaining a high value of output of the magnetron in the initial driving stage of the magnetron of the microwave oven.

2. Description of the Related Art

In general, microwave ovens are classified into two types: general microwave ovens and wall-mounted microwave ovens. The wall-mounted microwave ovens are called over-the-range microwave ovens and are installed over a gas range or a gas oven range in a kitchen.

The wall-mounted microwave oven functions not only to cook food but also to exhaust fumes, steam and the like that are generated by a gas range or a gas oven range disposed under the microwave oven.

In some countries where such wall-mounted microwave ovens are used, a maximum allowable current value of the microwave oven is limited. Accordingly, when a user desires to obtain maximum power of the magnetron of the wall-mounted microwave oven for cooking and/or exhaust operations, the maximum power should be limited to less than a certain value corresponding to the maximum allowable current value. Therefore, when the cooking and exhaust operations are carried out with the wall-mounted microwave oven simultaneously, a current that is applied to the microwave oven should be appropriately distributed between two operations (i.e., the cooking operation and the exhaust operation) so that a total value of applied current falls under the maximum allowable current value.

Where the maximum allowable current value of the microwave oven is limited, the rated current value of the microwave oven is generally limited to 15 amperes (A).

Accordingly, when the cooking and exhaust operations are carried out in the wall-mounted microwave oven simultaneously, the two operations are generally carried out within a rated value of 15 A.

A magnetron, which is a high-frequency generating device, can be controlled in an inverter manner. In accordance with the inverter manner, the output of a magnetron may be varied.

When normal heat generation is carried out with the magnetron, current, also known as anode current, passes through an anode of the magnetron and the magnetron generates high frequency output only when a heater of the microwave oven normally generates heat. A value obtained by multiplying the anode current by anode voltage, which is the voltage applied to the anode when the anode current passes through the anode, is power applied to the magnetron. In this case, the output power of the magnetron of the microwave oven is obtained by multiplying the applied power by an efficiency of the magnetron.

Accordingly, the output value of the magnetron is dependent upon the anode current. That is, as the anode current is increased, the output power of the magnetron is increased, and as the anode current is decreased, the output power of the magnetron is decreased.

With reference to FIGS. 1 and 2A–2D, a conventional method of controlling an output of a magnetron of a microwave oven is described.

FIG. 1 is a graph illustrating a characteristic of a general magnetron. FIG. 2A is a graph illustrating a conventional control of an anode current of the magnetron. FIG. 2B is a graph illustrating variations in an anode voltage of the magnetron according to the conventional control. FIG. 2C is a graph illustrating variations in an input current of the magnetron according to the conventional control. FIG. 2D is a graph illustrating variations in power consumption of the magnetron according to the conventional control.

As shown in FIG. 1, as time passes after the microwave oven is started, the characteristic curve of the anode voltage "V" of the magnetron is descending, while the characteristic curve of the anode current "A" is ascending.

The output of the magnetron of the microwave oven is controlled by adjusting the anode current. As shown in FIG. 2A, the anode current of the magnetron is controlled within an error range in a constant current control manner.

When the anode current is controlled in the constant current control manner as shown in FIG. 2A, the anode voltage descends and is saturated at a certain time as shown in FIG. 2B. The output of the magnetron descends in proportion to the anode voltage and is saturated at a certain time.

When the anode current of the magnetron is controlled in the constant current control manner with an initial input current of the microwave oven and the initial power consumption set, the anode voltage descends and is saturated at a certain time as described above and an input current and a power consumption over time are changed in proportion to the anode voltage as shown in FIGS. 2C and 2D. That is, as shown in FIGS. 2A, 2B, 2C and 2D, as the anode current is controlled in the constant current control manner, slopes of an input current curve and a power consumption curve become relatively low.

However, when the anode current is controlled in the constant current control manner to obtain a high value of output of the magnetron to ensure that electric parts, such as the magnetron, an inverter and the like, are not damaged in an initial driving stage of the microwave oven, the magnetron can obtain a high value of output increased by an extent corresponding to a difference between the initial input current and the saturated input current, thereby resulting in low efficiency of the microwave oven.

Additionally, as shown in FIGS. 2B and 2C, since the slopes of the anode voltage and input current become small, the initial input current value take a long time to be changed to the saturated current value.

For example, the anode current of the magnetron is controlled in the constant current control manner to produce a high value of output of the magnetron in the initial driving stage of the magnetron based on a condition that the initial input current value is set to 18 A and that the rated current value of the microwave oven is 15 A. In this case, the input current value take a long time to be changed to the rated current value of 15 A because the slope of the input current is small, so the conventional magnetron output control method is problematic in that electric parts, such as a magnetron, an inverter and the like, may be damaged by overheating.

SUMMARY OF THE INVENTION

Accordingly, an apparatus and method for controlling an output of a magnetron of a microwave oven is provided, which is capable of stably obtaining a high output value in an initial drive stage of the magnetron for a preset time.

Additional aspects and advantages of the invention will be set forth in part in the description which follows and, in part, will be obvious from the description, or may be learned by practice of the invention.

In order to accomplish the above and other aspects, a method of controlling the output of a magnetron of a microwave oven is provided, the microwave oven normally driving the magnetron to generate rated output using rated current, comprising setting a value of initial input current to generate the output of the magnetron higher than a rated output of the magnetron; driving the magnetron using the initial input current of the set value; and varying the value of the output of the magnetron within a preset time to prevent overheating caused by the driving of the magnetron.

Further, an apparatus is provided for controlling the output of a magnetron of a microwave oven, the microwave oven controlling the output of the magnetron by adjusting current inputted to the microwave oven, comprising a current detecting unit detecting anode current passing through an anode of the magnetron; and a microcomputer controlling the magnetron to generate an output of the magnetron higher than a rated output of the magnetron for a preset time based on the anode current detected by the current detecting unit.

BRIEF DESCRIPTION OF THE DRAWINGS

These and other aspects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
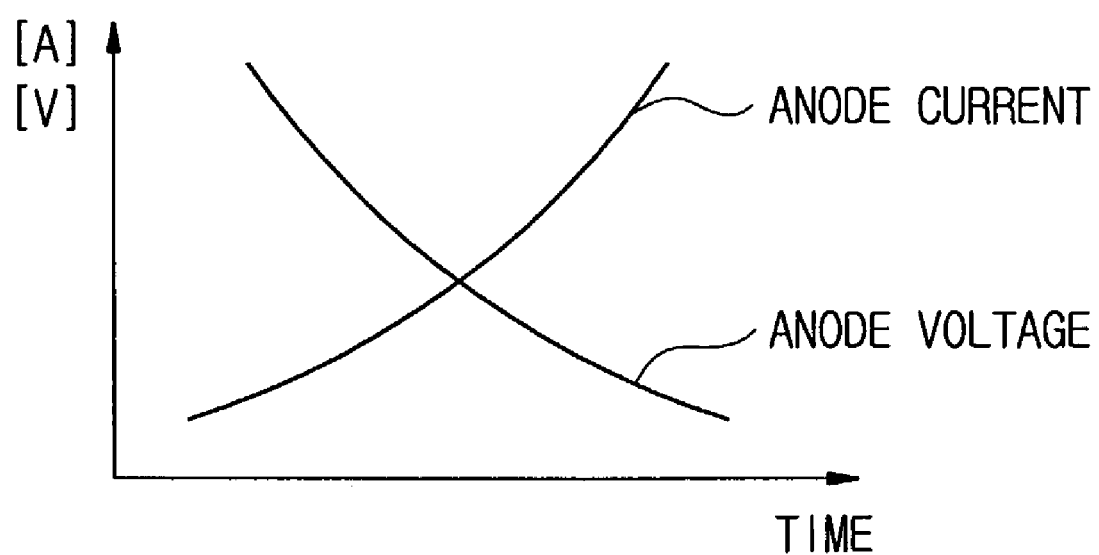
FIG. 1 is a graph illustrating a characteristic of a conventional magnetron.
Figure 2A:
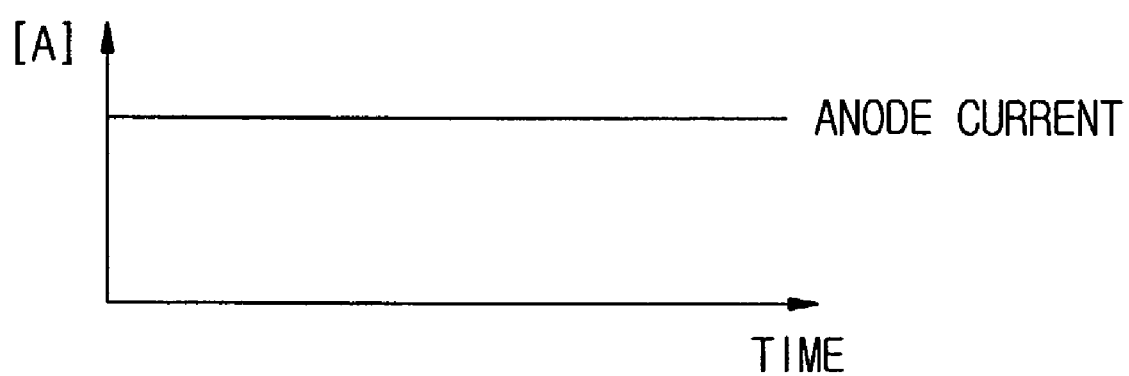
FIG. 2A is a graph illustrating a conventional control of an anode current of the magnetron in FIG. 1.
Figure 2B:
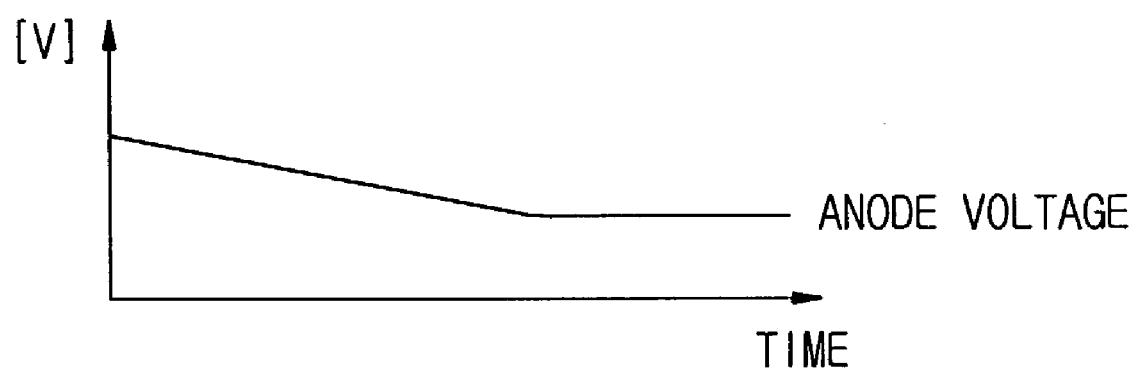
FIG. 2B is a graph illustrating variations in an anode voltage of the magnetron according to the conventional control.
Figure 2C:
FIG. 2C is a graph illustrating variations in an input current of the magnetron according to the conventional control.
Figure 2D:
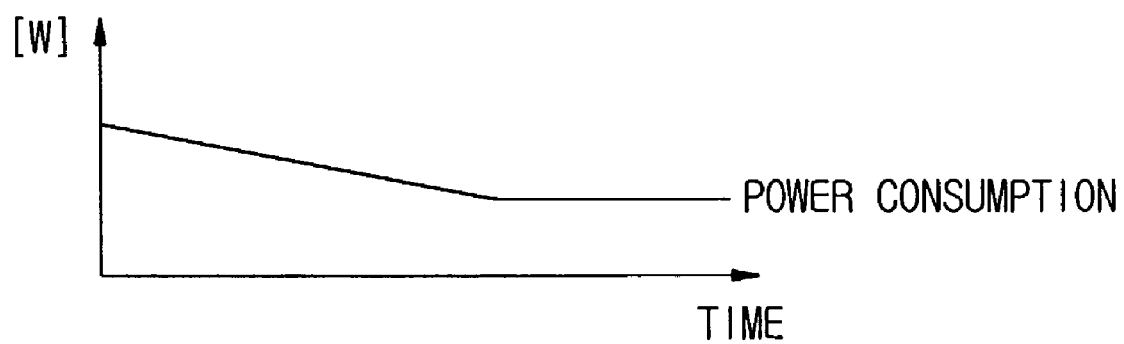
FIG. 2D is a graph illustrating variations in power consumption of the magnetron according to the conventional control.

Reference will now be made in detail to the preferred embodiments of the present invention, examples of which are illustrated in the accompanying drawings, wherein like reference numerals refer to like elements throughout.

Figure 3:
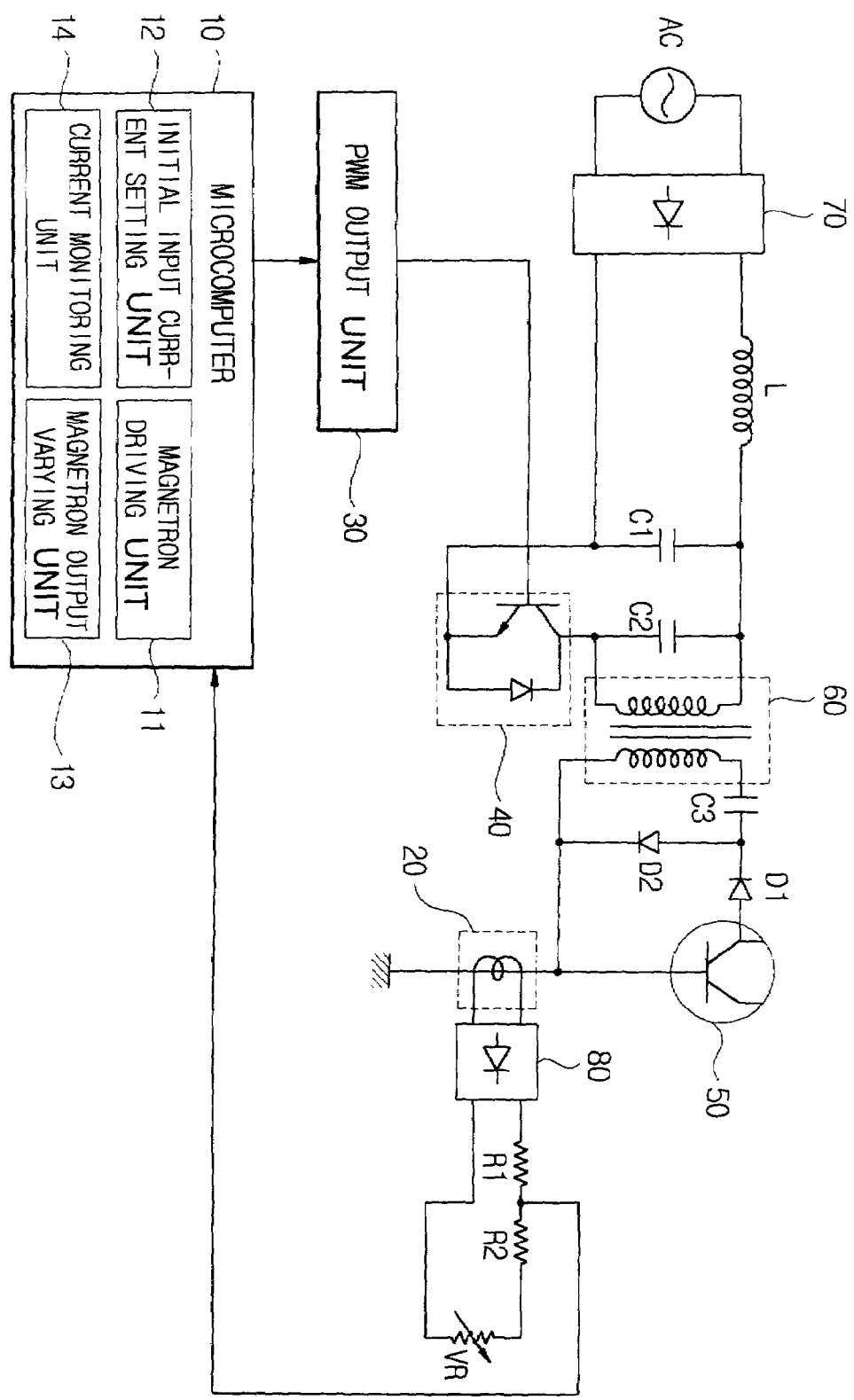
FIG. 3 is a block diagram illustrating an apparatus for controlling an output of a magnetron of a microwave oven in accordance with an embodiment the present invention.

FIG. 3 is a block diagram illustrating the magnetron output control apparatus of an embodiment of the present invention.

As shown in FIG. 3, a magnetron output control apparatus includes a current detecting unit 20 which detects anode current passing through an anode of a magnetron 50, a microcomputer 10 which controls the anode current detected by the current detecting unit 20 to less than or equal to an allowable current by determining whether the anode current is less than or equal to the allowable current, a Pulse Width Modulation (PWM) output unit 30 which outputs a PWM signal to control the anode current by receiving a control signal from the microcomputer 10, and a switching unit 40 which controls the anode current by receiving the PWM signal outputted from the PWM output unit 30.

The microcomputer 10 comprises a current monitoring unit 14 which monitors the anode current of the magnetron 50 detected from the current detecting unit 20, an initial input current setting unit 12 which sets an initial current inputted to the microwave oven, a magnetron driving unit 11 which drives the magnetron 50 according to the initial input current set by the initial input current setting unit 12, and a magnetron output varying unit 13 which varies an output of the magnetron 50 within a preset time.

A reference numeral 60 designates a high voltage transformer, reference numerals 70 and 80 designate rectifying unit, a reference character L designates an inductor, reference characters C1, C2, and C3 designate capacitors, a reference character D1 is a diode, and reference characters R1, R2 and Vr designates resistors.

Hereinafter, a magnetron output control method of a second embodiment of the present invention is described with reference to FIG. 4.

Figure 4:
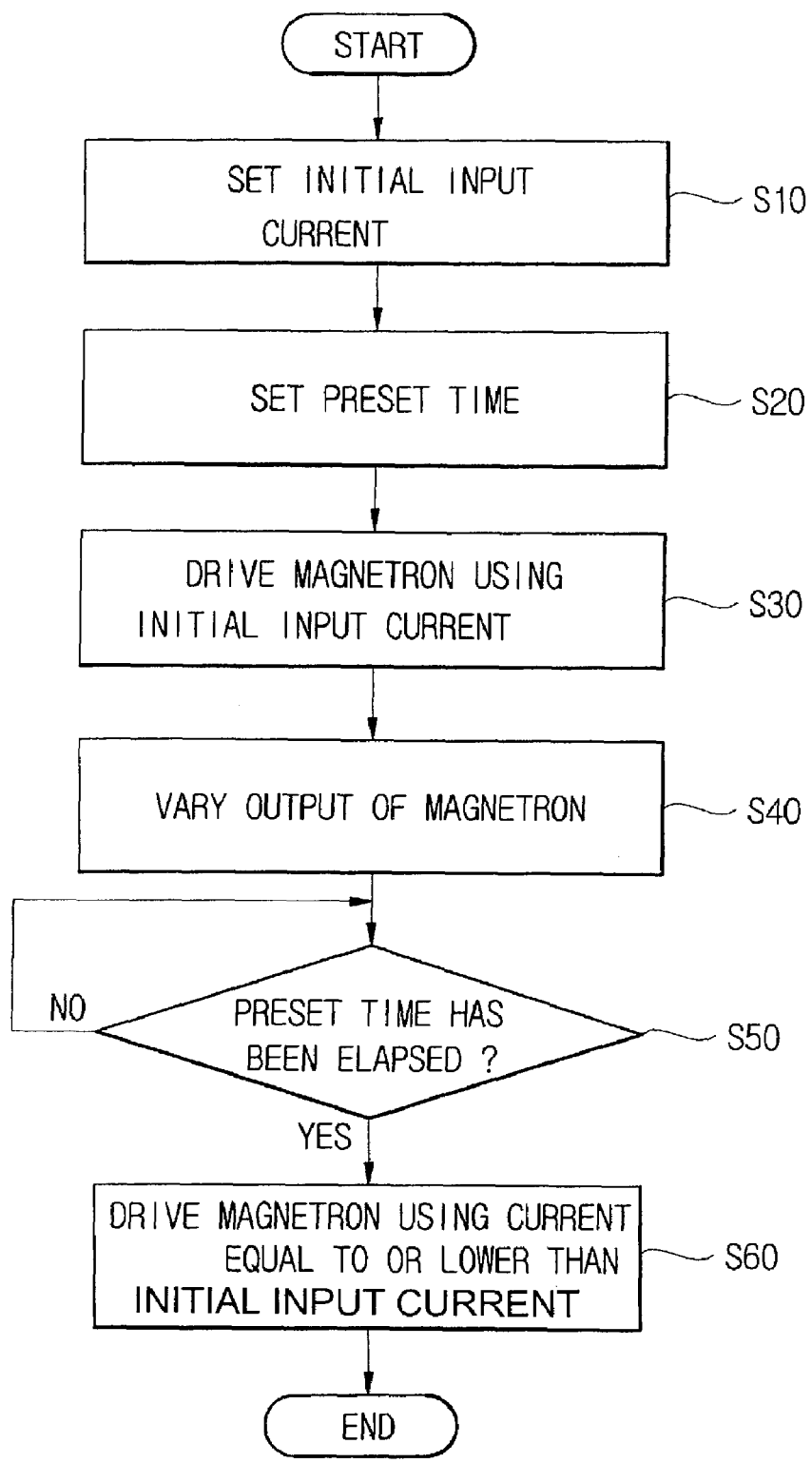
FIG. 4 is a flowchart illustrating a method of controlling the output of the magnetron of the microwave oven in accordance with the apparatus shown in FIG. 3.
Figure 5A:
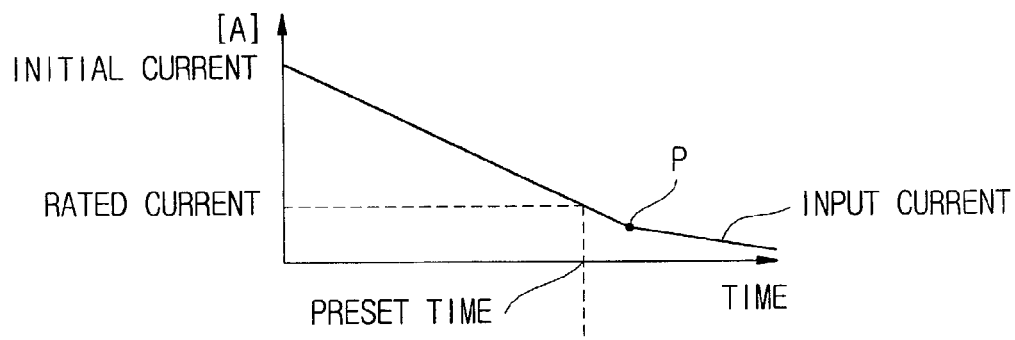
FIG. 5A is a graph illustrating variations in an input current of the microwave oven in accordance with the embodiment of the present invention.
Figure 5B:
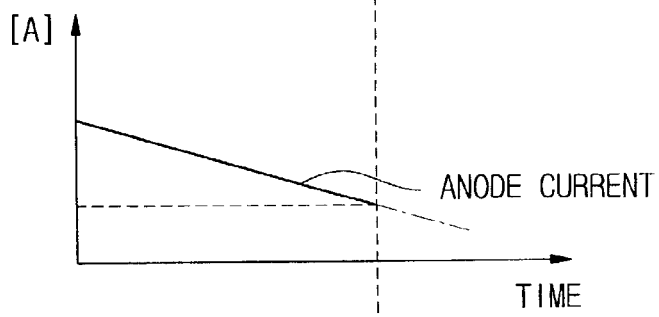
FIG. 5B is a graph illustrating variations in the anode current of the magnetron according to the variations in the input current in accordance with the embodiment of the present invention.
Figure 5C:
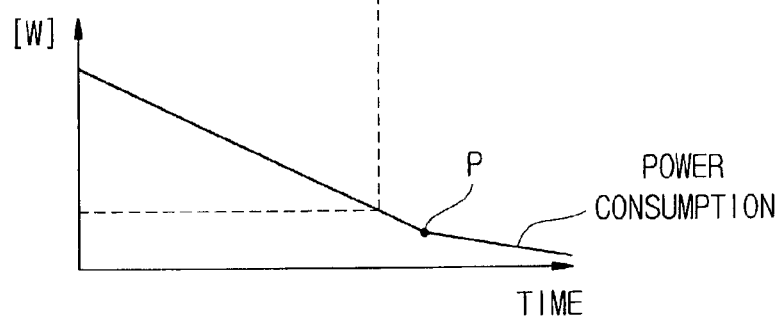
FIG. 5C is a graph illustrating variations in the power consumption of the magnetron according to the variations in the input current in accordance with the embodiment of the present invention.

FIG. 4 is a flowchart illustrating the magnetron output control method in accordance with the magnetron output control apparatus shown in FIG. 3.

As shown in FIG. 4, the magnetron output control method comprises an operation S10 of setting an initial input current of the microwave oven to generate output higher than a rated power of the magnetron 50, an operation S20 of setting a preset time after which the initial input current is changed to the rated current of the microwave oven 50, an operation S30 of driving the magnetron 50 according to the initial input current set at the operation S10, an operation S40 of varying the output of the magnetron 50 within the preset time so as to prevent overheating caused by the driving of the magnetron 50, an operation S50 of determining whether the preset time has elapsed, and an operation S60 of driving the magnetron 50 using current lower than or equal to the rated current of the microwave oven if the preset time has elapsed.

Hereinafter, the magnetron output control method of shown in FIG. 4 is described using an example.

In some countries, such as the countries in North America and the like, a maximum allowable current of a wall-mounted microwave oven is limited. Accordingly, a user or designer of the microwave oven sets the initial input current higher than a rated current using the initial input current controlling unit 12, and drives the magnetron 50 according to the set initial input current.

That is, when the microwave oven is driven using current higher than the rated current for the preset time, the output in proportion to the current inputted for the preset time can be obtained. The initial input current is set to correspond to a desired output within the maximum allowable current of the microwave oven.

Additionally, the preset time is set, depending upon the set initial input current. For example, the preset time can be set within a usable time of a power fuse obtained by experiments, or to substantially equal a time required to reach a preset temperature which can be obtained by measuring a temperature of the magnetron 50.

Thereafter, when the preset time has elapsed, the input current is controlled to be lower than or equal to the rated current, which is carried out by controlling the anode current of the magnetron 50.

For example, when a simulation is carried out to produce the output having a certain slope based on a condition that the initial input current is set to 18 A, the preset time is set to 5 minutes and the rated current is set to 15 A, and the anode current of the magnetron 50 is proportional to the input current, so the anode current can be easily obtained.

That is, if the anode currents are detected respectively as 5 A and 2 A when the input currents are 18 A and 15 A, the anode currents are respectively 4 A and 3 A when the input currents are 17 A and 16 A.

The microcomputer 10 is set to output a control signal corresponding to an obtained anode current to the PWM output unit 30. The PWM output unit 30 receives the control signal from the microcomputer 10, and outputs a PWM signal to the switching unit 40 so as to control the anode current by regulating a duty ratio of the PWM signal using the control signal.

Accordingly, where the maximum allowable current of the wall-mounted microwave oven is limited, the above-described method can be successfully used to obtain a high output of the magnetron in an initial driving stage of the magnetron of the microwave oven.

Although the output of the magnetron is described as being controlled by adjusting the anode current of the magnetron, the output of the magnetron may be controlled by directly adjusting current input to the microwave oven.

As described above, the magnetron output control apparatus and method of present invention can stably obtain a high value of output of the magnetron in the initial driving stage of the magnetron without the overheating of a magnetron and an inverter in the microwave oven, so cooking time can be reduced and cooking performance can be improved, thereby providing stable and reliable products to users.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling an output of a magnetron of a microwave oven, the microwave oven normally driving the magnetron to generate rated output using rated current, comprising:
   setting an initial input current to generate an output higher than a rated output of the magnetron;
   setting an initial preset time after which the initial input current is changed to the rated current, the initial preset time being within a usable time of a power fuse;
   driving the magnetron using the initial input current of the setting; and
   varying the output of the magnetron after the initial preset time has elapsed to prevent overheating caused by the driving of the magnetron.

2. The method according to claim 1, wherein the initial input current is set within a range between the rated current of the microwave oven and a maximum allowable current of the microwave oven.

3. The method according to claim 1, wherein the varying of the output of the magnetron comprises controlling anode current passing through an anode of the magnetron.

4. The method according to claim 3, wherein the controlling of the anode current comprises:
   obtaining first and second anode currents of the magnetron corresponding to the set initial input current of the magnetron and the rated current of the magnetron, respectively; and
   controlling the first anode current to be changed to the second anode current if the preset time has elapsed.

5. The method according to claim 1, wherein the varying the output of the magnetron comprises:
   counting driving time of the magnetron;
   comparing the counted driving time with the preset time; and
   varying the output of the magnetron if the counted driving time is shorter than the preset time.

6. The method according to claim 5, wherein the varying the output of the magnetron further comprises:
   driving the magnetron using a current less than the rated current if the counted driving time is longer than the preset time.

7. The method according to claim 1, wherein the initial input current is set less than a maximum allowable current of the microwave oven.

8. The method according to claim 1, wherein the adjusting of the initial current comprises by controlling the current into the microwave oven.

9. The method according to claim 1, wherein the adjusting of the initial current comprises:
   obtaining first and second anode currents of the magnetron corresponding to the initial input current of the magnetron and the rated current of the magnetron, respectively; and
   controlling the first anode current to be adjusted over a preset period of time to the second anode current.

10. The method according to claim 1, wherein the adjusting the output of the magnetron comprises:
    counting a driving time of the magnetron; and
    varying the output of the magnetron according to the counted driving time.

11. The method according to claim 10, wherein the varying of the output of the magnetron comprises:
    comparing the counted driving time with the preset time;
    driving the magnetron using a current greater than the rated current if the counted driving time is less than the preset time; and
    driving the magnetron using a current less than the rated current if the counted driving time is greater than the preset time.

12. The method according to claim 1, wherein the varying of the output of the magnetron comprises:
    regulating a duty ratio of an input current of the magnetron by a PWM signal.

13. The method according to claim 1, wherein the adjusting of the output of the magnetron comprises:
    measuring a temperature of the magnetron; and varying the output of the magnetron according to the measured temperature of the magnetron.

14. The method according to claim 1, wherein the adjusting of the output of the magnetron comprises:
measuring a temperature of the magnetron; and
varying the output of the magnetron when the temperature of the magnetron reaches a preset temperature.

15. An apparatus controlling an output of a magnetron of a microwave oven, the microwave oven controlling the output of the magnetron by adjusting current inputted to the microwave oven, comprising:
a current detecting unit detecting anode current passing through an anode of the magnetron; and
a microcomputer setting an initial input current inputted to the microwave oven, controlling the magnetron to generate an output higher than a rated output of the magnetron for a preset time based on the anode current detected by the current detecting unit and changing the input current to a rated current after the preset time has elapsed,
wherein the preset time is set to be within a usable time of a power fuse.

16. The apparatus according to claim 15, wherein the microcomputer reads first and second anode currents of the magnetron, which correspond to a set initial input current and a rated current, respectively, through the current detecting unit, and controls the first anode current to be changed to the second anode current if the preset time has elapsed.

17. The apparatus according to claim 16, wherein the initial input current is set to be in a range between the rated current and a maximum allowable current of the microwave oven.

18. A method of controlling an output of a magnetron of a microwave oven, comprising:
setting an initial preset time after which an initial input current is changed to a rated current, the initial preset time being within a usable time of a power fuse;
driving the magnetron at the initial input current greater than the rated current of the magnetron; and
adjusting the initial input current of the magnetron, after the initial preset time has elapsed, to less than the initial input current to prevent overheating of the magnetron.

19. An apparatus controlling an output of a magnetron of a microwave oven, the microwave oven having a current detecting unit detecting anode current passing through an anode of the magnetron and controlling the output of the magnetron by adjusting current inputted to the microwave oven, comprising:
a controller setting an initial input current inputted to the microwave oven, controlling the magnetron to generate an output higher than a rated output of the magnetron for a preset time based on the anode current detected by the current detecting unit and changing the input current to a rated current after the preset time has elapsed,
wherein the preset time is set to be within a usable time of a power fuse.

20. The apparatus according to claim 19, wherein the controller determines first and second anode currents of the magnetron, which correspond to the initial input current and the rated current of the magnetron, respectively, through the current detecting unit, and controls the first anode current to be changed to the second anode current if the preset time has elapsed.

21. The apparatus according to claim 20, wherein the initial input current is less than or equal to a maximum allowable current of the microwave oven.

22. The apparatus according to claim 19, further comprising:
a switching unit to regulate a duty ratio of an input current of the magnetron; and
a PWM output unit controlled by the controller to output a PWM signal to switching unit to switch the switching unit.

23. An apparatus controlling an output of a magnetron of a microwave oven, the microwave oven having a current detecting unit detecting anode current passing through an anode of the magnetron and controlling the output of the magnetron by adjusting current inputted to the microwave oven, comprising:
a controller setting an initial input current, driving the magnetron at the initial input current greater than a rated current of the magnetron; and adjusting the initial input current, over a period of time, to less than the rated current to prevent overheating of the magnetron,
wherein the period of time is set to be within a usable time of a power fuse.

* * * * *